United States Patent
Blazer et al.

(10) Patent No.: US 9,669,592 B2
(45) Date of Patent: Jun. 6, 2017

(54) METHOD OF MANUFACTURING A FIBER OPTIC DROP CABLE

(71) Applicant: Corning Optical Communications LLC, Hickory, NC (US)

(72) Inventors: Bradley Jerome Blazer, Granite Falls, NC (US); Andrew S Dodd, Hickory, NC (US); Dieter Erwin Kundis, Lautertal (DE); Sebastian Olszewski, Lodz (PL)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 509 days.

(21) Appl. No.: 14/206,327

(22) Filed: Mar. 12, 2014

(65) Prior Publication Data
US 2015/0021799 A1   Jan. 22, 2015

Related U.S. Application Data

(63) Continuation of application No. PCT/US2013/051425, filed on Jul. 22, 2013, which is
(Continued)

(51) Int. Cl.
*B29D 11/00* (2006.01)
*G02B 6/44* (2006.01)

(52) U.S. Cl.
CPC ...... *B29D 11/00701* (2013.01); *G02B 6/4432* (2013.01); *G02B 6/4495* (2013.01); *G02B 6/4486* (2013.01)

(58) Field of Classification Search
CPC .. G02B 6/4432; G02B 6/4495; G02B 6/4486; B29D 11/00701
See application file for complete search history.

(56) References Cited

U.S. PATENT DOCUMENTS

| | | | |
|---|---|---|---|
| 5,748,823 A | 5/1998 | Nave | 385/113 |
| 5,822,485 A | 10/1998 | Nelson et al. | 385/112 |

(Continued)

FOREIGN PATENT DOCUMENTS

| | | | |
|---|---|---|---|
| JP | 2006-162703 A | 6/2006 | G02B 6/44 |
| JP | 2006-171570 A | 6/2006 | G02B 6/44 |

(Continued)

OTHER PUBLICATIONS

Superior Essex, Rugged Indoor/Outdoor MDU, Rev 6/12 Ed 11.0, p. B-13.
(Continued)

*Primary Examiner* — Mathieu Vargot
(74) *Attorney, Agent, or Firm* — William D. Doyle (57) ABSTRACT

A method of manufacturing a fiber optic cable includes manufacturing a subunit and manufacturing an outer portion. Manufacturing the subunit includes extruding a subunit jacket over a first reinforcement material constraining an optical fiber. Manufacturing the outer portion of the fiber optic cable includes extruding an outer jacket over a second reinforcement material between the outer jacket and the subunit jacket. Hoop stress is applied to the second reinforcement material by the outer jacket, which constrains the second reinforcement material such that it is positioned and oriented to provide anti-buckling support to the fiber optic cable and mitigate effects on the optical fiber of jacket shrinkage due to low temperatures.

20 Claims, 6 Drawing Sheets

Related U.S. Application Data a continuation of application No. 13/560,409, filed on Jul. 27, 2012, now Pat. No. 8,705,921.

(56) References Cited

U.S. PATENT DOCUMENTS

| | | | |
|---|---|---|---|
| 5,838,864 A | 11/1998 | Patel et al. | 385/113 |
| 5,852,698 A | 12/1998 | Bringuier | 385/113 |
| 6,178,278 B1 | 1/2001 | Keller et al. | 385/109 |
| 6,389,204 B1 | 5/2002 | Hurley | 385/102 |
| 6,400,874 B1 | 6/2002 | Schmidt et al. | 385/109 |
| 6,453,097 B1 | 9/2002 | Newton et al. | 385/102 |
| 6,487,347 B2 | 11/2002 | Bringuier | 385/113 |
| 6,501,887 B1 | 12/2002 | Bringuier et al. | 385/109 |
| 7,340,134 B1 | 3/2008 | Hudson, II et al. | 385/100 |
| 7,397,991 B1 | 7/2008 | Register | 385/102 |
| 8,107,781 B2 * | 1/2012 | Kachmar | G02B 6/443 385/100 |
| 2005/0013573 A1 | 1/2005 | Lochkovic et al. | 385/128 |
| 2006/0280413 A1 | 12/2006 | Paschal et al. | 385/112 |
| 2008/0031580 A1 | 2/2008 | Keller et al. | 385/113 |
| 2008/0279514 A1 | 11/2008 | Kundis et al. | 385/113 |

FOREIGN PATENT DOCUMENTS

| | | | | |
|---|---|---|---|---|
| JP | 2010-139631 A | 6/2010 | | G02B 6/44 |
| WO | WO 2011/137236 A1 | 11/2011 | | B29C 47/02 |

OTHER PUBLICATIONS

Patent Cooperation Treaty International Search Report for International Application No. PCT/US2013/051425; mailing date Oct. 28, 2013—4 pages.

Acome, Acoptic—FTTH Product Datasheet, UNB1629—Outside branch cable—Aerial—Conduit Strippable cable for accessing subscriber cable, Jan. 28, 2013, 2 pages.

Prysmian, DFC—Duplex Fibre Cable (Double sheath), Ref. NT6356/R1 Code FPTM / K1ME, 2007, 1 page.

* cited by examiner

METHOD OF MANUFACTURING A FIBER OPTIC DROP CABLE

RELATED APPLICATIONS

This Application is a continuation of International Application No. PCT/US2013/051425 filed Jul. 22, 2013, which claims priority to U.S. application Ser. No. 13/560,409 filed on Jul. 27, 2012, both of which are incorporated by reference herein in their entirety.

BACKGROUND

Aspects of the present disclosure relate generally to a fiber optic cable configured for use in fiber-to-the-home (FTTH) applications or other applications.

A "drop cable" is typically designed for connecting optical fibers from a larger network, outside a home or business, to a local network of a home or business. The drop cable may carry one or a small number of optical fibers, and may further be designed to fully support its own weight when strung through the air. Further the drop cable may be designed to withstand the elements of wind, rain, and ice, while mitigating the effects on the optical fibers of shrinking or expanding of the cable due to axial loading, cold-temperatures, or other causes. In addition, the drop cable should be narrow or small enough to easily pass through small tunnels or ducts (e.g., an inch- or even a half-inch-diameter duct), as may be used in fiber-to-the-home applications.

To accomplish some or all such tasks, the drop cable may include rigid strength members, such as glass-reinforced plastic (GRP) or steel rods. The rods provide tensile strength and oppose buckling. However, the rods may limit flexibility of the cable and may also be difficult to cut through and remove should a portion of the cable jacket need to be removed during the installation of the optical fiber and associated hardware. Accordingly, a need exists for a fiber optic cable that is some or all of a small or narrow fiber optic drop cable having tensile/anti-buckling ruggedness and weather-ability, but with improved flexibility and access to the optical fibers.

SUMMARY

One embodiment relates to a fiber optic cable that includes a subunit and an outer portion. The subunit includes a subunit jacket defining a passageway interior thereto, an optical fiber extending through the passageway, and a first reinforcement material constraining the optical fiber within the subunit jacket such that the optical fiber and the subunit jacket are coupled to one another by way of the first reinforcement material. The outer portion of the fiber optic cable includes an outer jacket defining an outer periphery of the cable and a second reinforcement material between the outer jacket and the subunit jacket. The second reinforcement material includes fiberglass yarn, and hoop stress applied to the fiberglass yarn by the outdoor jacket axially constrains the fiberglass yarn such that the fiber glass yarn is positioned and oriented to provide anti-buckling support to the fiber optic cable and mitigate effects on the optical fiber of jacket shrinkage due to low temperatures.

Another embodiment relates to a fiber optic cable that includes a subunit and an outer jacket. The subunit includes a subunit jacket defining a passageway interior to the subunit jacket, one or more optical fibers extending through the passageway, and a first reinforcement material constraining the optical fiber(s) within the subunit jacket such that the optical fiber(s) and the subunit jacket are coupled to one another by way of frictional contact or adhesion with the first reinforcement material. The first reinforcement material is at least one of (i) so positioned and (ii) non-rigid in bending, such that the subunit has essentially no bend preference (e.g., substantially no bend preference; a bend preference less than the ratio of 2:1, 1.5:1, or 1.25:1). The outer portion of the fiber optic cable includes an outer jacket defining an outer periphery of the cable, which may include a skin or a composite structure. A second reinforcement material is between the outer jacket and the subunit jacket, where the second reinforcement material is at least one of so positioned and non-rigid in bending such that, in combination with the subunit, the fiber optic cable has essentially no bend preference. The second reinforcement material includes fiberglass yarn, and hoop stress applied to the fiberglass yarn by the outdoor jacket axially constrains the fiberglass yarn between the subunit and outer jackets such that the fiberglass yarn is held in position and oriented to provide anti-buckling support to the fiber optic cable and thereby mitigate effects on the optical fiber of jacket shrinkage due to low temperatures experienced by the fiber optic cable.

Other embodiments include methods of manufacturing such a fiber optic cable. One such method includes a step of pressure-extruding (e.g., at 100 bar or more) the outer jacket over the second reinforcement material to tightly constrain components of the fiber optic cable interior to the outer jacket. Another such method includes a step of tensioning the optical fiber while extruding the subunit jacket about first reinforcement material and the optical fiber so that the optical fiber is without excess fiber length following cooling and shrinkage of the subunit jacket after extruding the subunit jacket.

Yet another embodiment includes a fiber optic cable including indoor and outdoor jackets, an optical fiber, first and second reinforcement materials, and material discontinuities in the outdoor jacket. The indoor jacket defines a passageway interior thereto and the optical fiber extends through the passageway of the indoor jacket. Furthermore, the indoor jacket includes a flame-retardant jacketing material and is configured for indoor operation (e.g., plenum- or riser-rated). The first reinforcement material constrains the optical fiber within the indoor jacket such that the optical fiber and indoor jacket are coupled to one another by way of the first reinforcement material. The outdoor jacket defines an outer periphery of the cable, and the outdoor jacket includes a medium- or high-density polyethylene and is configured for outdoor operation (e.g., blocks ultra-violet light). The material discontinuities in the outdoor jacket provide lengthwise paths for tearing open the outdoor jacket to access the indoor jacket. The second reinforcement material is embedded in or bonded to the outdoor jacket such that second reinforcement material remains attached to the outdoor jacket when the outdoor jacket is torn open via the material discontinuities. Either the second reinforcement material is non-stranded or the material discontinuities spiral lengthwise along the outdoor jacket such that lay lengths of the material discontinuities and the reinforcement material match one another (e.g., the material discontinuities overlay the interface between individual yarns of the second reinforcement material). Accordingly, the outdoor jacket may be torn open by way of the discontinuities to access the indoor jacket with at least a portion of the second reinforcement material simultaneously controlled and moved out of the way for accessing the indoor jacket.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

Before turning to the following Detailed Description and Figures, which illustrate exemplary embodiments in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures or described in the text relating to one of the embodiments may well be applied to other embodiments shown in another of the Figures or described elsewhere in the text.

Figure 1A:
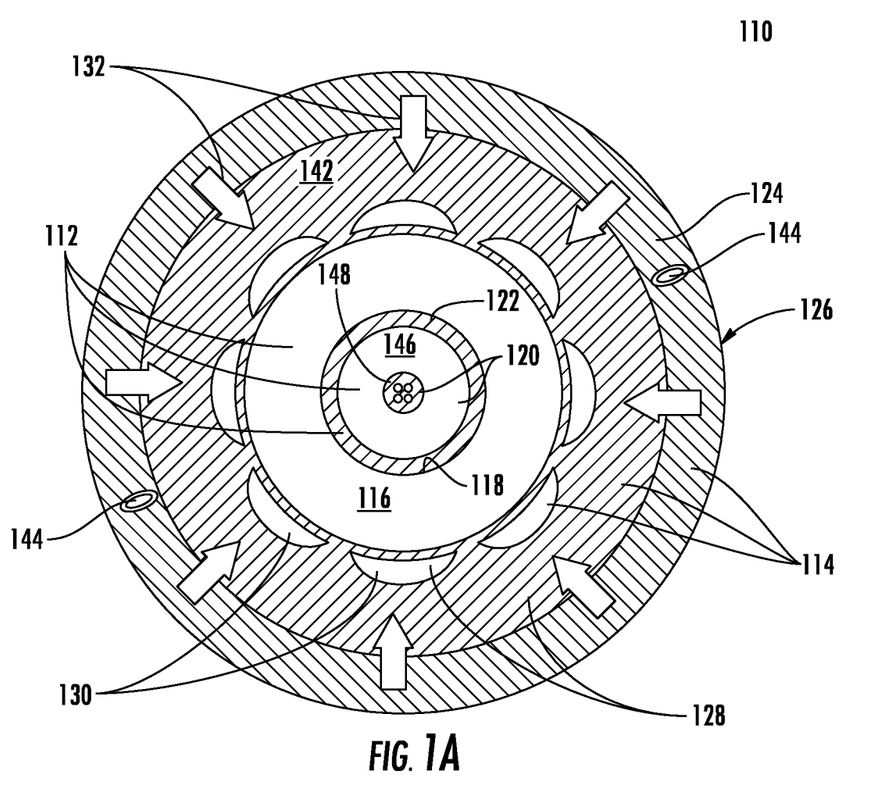
FIG. 1A is a sectional view of a fiber optic cable according to an exemplary embodiment.
Figure 1B:
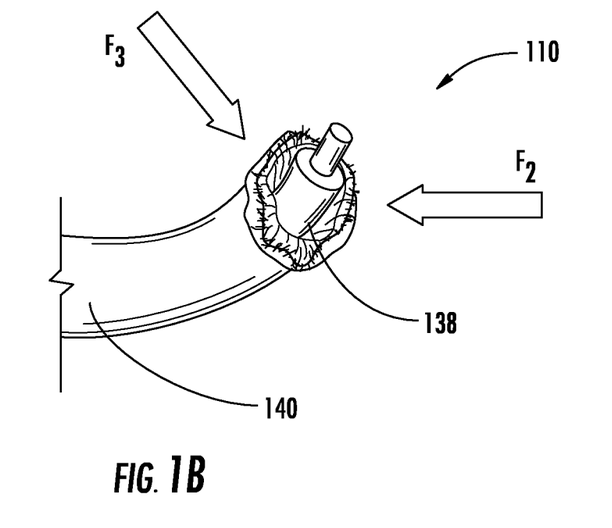
FIG. 1B is a top-perspective view showing a sectional view of the fiber optic cable of FIG. 1A.
Figure 2:
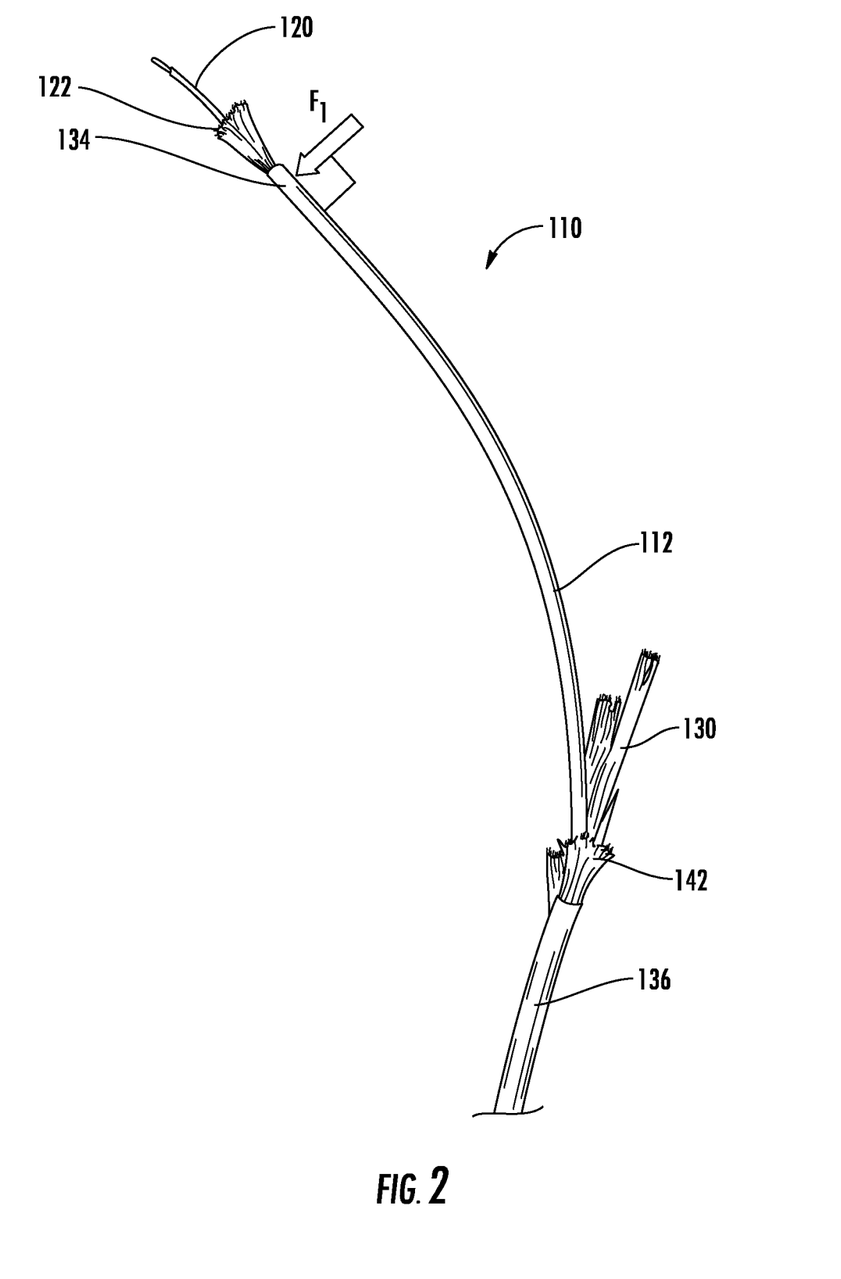
FIG. 2 is a side view of the fiber optic cable of FIG. 1 with the outer jacket partially open to show aramid fibers and fiber-glass yarns beneath the outer jacket.

Referring to FIG. 1A as well as FIGS. 1B-5, a fiber optic cable 110 includes a subunit 112 and an outer portion 114. The subunit 112 includes a subunit jacket 116 (e.g., sheath) defining a passageway 118 interior thereto, an optical fiber 120 extending through the passageway 118, and a first reinforcement material 122 (e.g., strength material, strength member, aramid fibers or yarns) constraining the optical fiber 120 within the subunit jacket 116 such that the optical fiber 120 and the subunit jacket 116 are coupled to one another by way of the first reinforcement material 122.

In some embodiments, the subunit jacket 116 is pressure extruded (e.g., extruded at a pressure of at least 100 bar; no more than 200 bar) over the first reinforcement material 122, which subsequently cools and shrinks to tightly constrain the first reinforcement 122 and the optical fiber 120. Frictional interfaces between the first reinforcement material 122 and the subunit jacket 116 and between the first reinforcement material 122 and optical fiber 120 provide coupling between the subunit jacket 116 and the optical fiber 120. In other embodiments, an adhesive is used to couple the subunit jacket 116 and optical fiber 120 by way of the first reinforcement material 122. In still other embodiments, the subunit jacket 116 and optical fiber 120 are otherwise coupled, with or without inclusion or support from reinforcement material.

Still referring to FIG. 1, the outer portion 114 of the fiber optic cable 110 includes an outer jacket 124 defining an outer periphery 126 (e.g., exterior surface, outside perimeter in round embodiments) of the cable 110 and a second reinforcement material 128 between the outer jacket 124 and the subunit jacket 116. In some embodiments, the second reinforcement material 128 includes fiberglass yarn 130, and hoop stress (shown as arrows 132 in FIG. 1) applied to the fiberglass yarn 130 by the outer jacket 124 constrains the fiberglass yarn 130 (i.e., holds the fiberglass yarn 130 in a generally fixed position and orientation with respect to the cable 110).

According to an exemplary embodiment, the fiber glass yarn 130 is positioned and oriented to provide anti-buckling support to the fiber optic cable 110 and to mitigate effects of jacket shrinkage due to low temperatures on the optical fiber 120. More specifically, the fiberglass yarn 130 may be aligned with the length of the fiber optic cable 110, having no lay length; or may alternatively be stranded around the subunit 112 (i.e., wound), such as helically or S-Z stranded, with a lay length or average lay length of at least 100 mm, such as at least 200 mm, where the lay length is the lengthwise distance along the cable 110 for one cycle of the corresponding winding pattern (e.g., one full helical wrap around the subunit 112).

Use of flexible (yet constrained) fiberglass yarn 130 in the second reinforcement material 128 may overcome stiffness problems associated with glass-reinforced plastic rods, steel rods, and other strength members discussed in the Background section, while the fiberglass yarn is held positioned and oriented to provide anti-buckling reinforcement. Hoop stress from the outer jacket holds the fiberglass yarn 130 in place so that the individual fibers of the yarn 130 work together to provide anti-buckling strength in the lengthwise direction of the cable 110, without a solid resin material to bind the individual fibers of the yarn 130 to one another. Instead, the individual fibers of the fiberglass yarn 130 are generally able to move relative to one another as the cable bends, which allows for improved flexibility of the fiber optic cable 110. In some embodiments, the fiberglass yarn 130 includes a non-rigid binding material, such as cohesive polymers or an extremely low-density, smooth, soft coating, to clump the fibers together in flattened strips (e.g., generally flat, see FIG. 1), as is the case with commercially-available fiberglass yarns sold under the product code FVAPW1200 manufactured by Gotex S.A. (water blocking coated fiberglass yarn, 1.250 TEX). In some embodiments, the coating may include water-blocking additives (e.g., super-absorbent polymers).

According to an exemplary embodiment, the first reinforcement material 122 includes (e.g., is formed from, consists of) aramid fibers, which may be grouped in yarns.

The aramid fibers provide increased tensile strength to the subunit 112, and the subunit 112 may be configured to support short-term loads of at least 200 N. In some embodiments, aramid fibers of the first reinforcement material 122 are aligned (e.g., generally parallel) with the optical fiber 120, not having a lay length. According to an exemplary embodiment, the aramid fibers of the first reinforcement material 122 fully surround the optical fiber 120, separating the optical fiber 120 from the subunit jacket 116, thereby forming a barrier mitigating sticking of the optical fiber 120 to the subunit jacket 116 during extrusion manufacturing of the subunit 112.

Figure 6:
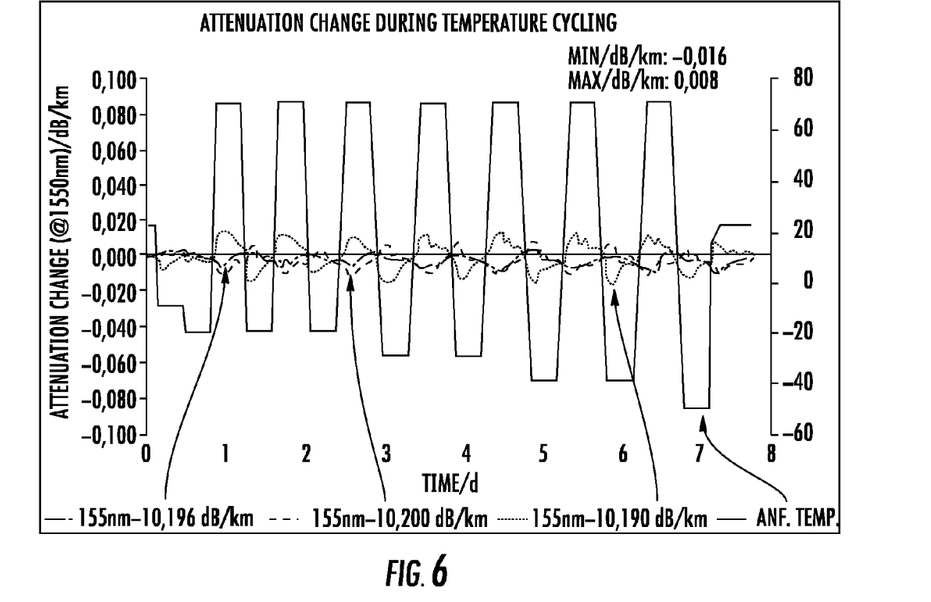
FIG. 6 is a graphical representation of attenuation versus time with respect to changes in temperature for the cable of FIGS. 1-5.

According to an exemplary embodiment, the second reinforcement material 128 further includes aramid fibers 142 in addition to the fiberglass yarn 130. In some embodiments, the aramid fibers 142 fill the space between the outer and subunit jackets 116, 124 not filled by the fiberglass yarn 130. The aramid fibers 142 of the second reinforcement material 128 may be positioned between the fiberglass yarn 130 and the outer jacket 124; and in some such embodiments, the fiberglass yarn 130 adjoins the indoor jacket 116 and is held tightly thereto by the hoop stress (see FIG. 1). As such, when straight and not tensioned, the fiber optic cable 110 is structured (and the optical fiber 120 is selected) such that the optical fiber has average attenuation at 1310 nm wavelength light of 0.5 dB/km or less and at 1550 nm wavelength light of 0.3 dB/km or less with environmental temperatures of the fiber optic cable 110 cycling between 60 and −30° C. per day (see, e.g., exemplary test data provided in FIG. 6 corresponding to cycled temperature testing of the fiber optic cable 110).

According to an exemplary embodiment, the subunit 112 has essentially (e.g., substantially) no preferential bend, meaning that the subunit 112 is able to bend in all directions perpendicular to the length of the subunit 112 with the same amount of bending force. For example, in some such embodiments, magnitudes of forces $F_1$ (see FIG. 2), for loading the subunit 112 on a free end 134 thereof in a direction orthogonal to the length of the subunit 112 and holding fixed a portion 136 of the subunit 112 that is 100 mm from the free end 134 of the subunit 112 to bend the subunit 112 between the free end 134 and fixed portion 136 thereof so that the lengthwise center of the free end 134 of the subunit 112 is directed 30-degrees from the lengthwise center of the fixed portion 136 of the subunit 112 in any two different bend directions, differ by less than 25% of the magnitude of the greater of the forces $F_1$ for bending the subunit (e.g., less than 20%, less than 10%).

According to an exemplary embodiment, the second reinforcement material 128, in combination with the subunit 112, is positioned or arranged such that the fiber optic cable 110, as a whole, has essentially no bend preference. For example, in some such embodiments, magnitudes of forces $F_2$, $F_3$ (see FIG. 1B), for loading the fiber optic cable on a free end 138 thereof in a direction orthogonal to the length of the fiber optic cable 110 and holding a fixed portion 140 of the fiber optic cable 110 that is 250 mm from the free end 138 of the fiber optic cable 110 to bend the fiber optic cable 110 between the free end 138 and fixed portion 140 thereof so that the lengthwise center of the free end 138 of the fiber optic cable 110 is directed 30-degrees from the lengthwise center of the fixed portion 140 of the fiber optic cable 110 in any two different bend directions $F_2$, $F_3$, differ by less than 25% of the magnitude of the greater of the forces $F_2$, $F_3$ for bending the fiber optic cable 110 (e.g., less than 20%, less than 10%).

In some embodiments, to achieve essentially no bend preference, the reinforcement materials 122, 128 are evenly distributed around the cable 110. In other embodiments, the reinforcement materials 122, 128 may further be or alternatively be formed from materials without substantial bend stiffness (e.g., fiberglass yarn 130 and aramid fiber 142). Improved flexibility and/or the lack of a preferential bend axis is believed to improve the maneuverability and handling qualities of the fiber optic cable 110 relative to less flexible cables and/or cables with preferential bends. Such flexibility may allow the cable 110 to pass through ducts with successive changes in direction that are not co-planar, without stressing the cable 110 and without substantial opposition to bending by reinforcement materials. In other contemplated embodiments, a cable with rigid strength members and/or preferential bending may incorporate features disclosed herein, such as the constrained fiberglass 130 and subunit 112, for example.

Figure 3:
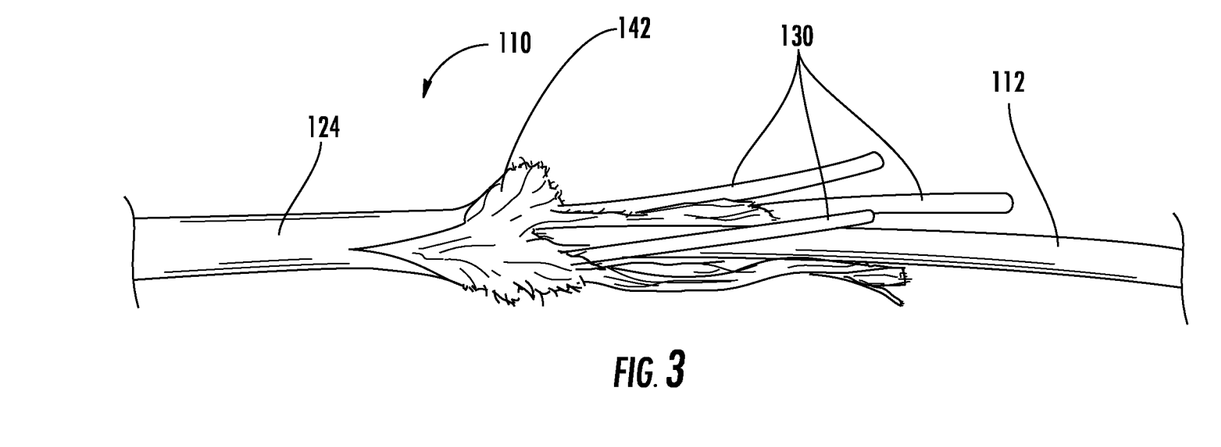
FIG. 3 is a side view of the fiber optic cable of FIG. 1 showing a subunit extending from between the yarns.
Figure 4:
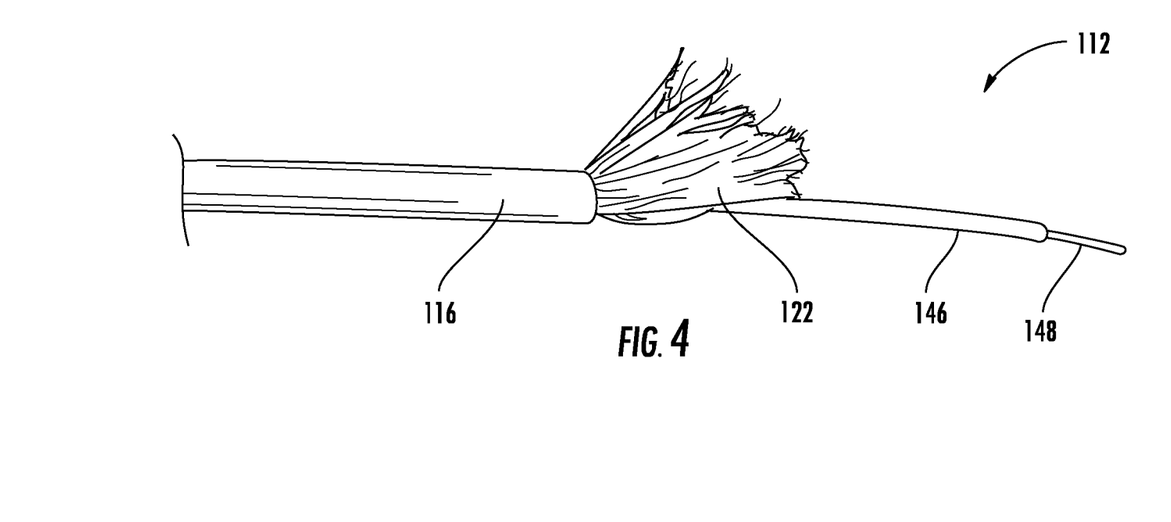
FIG. 4 is a side view of the subunit of FIG. 3 with the end opened to show aramid fibers and a tight-buffered optical fiber extending from a subunit jacket.
Figure 5:
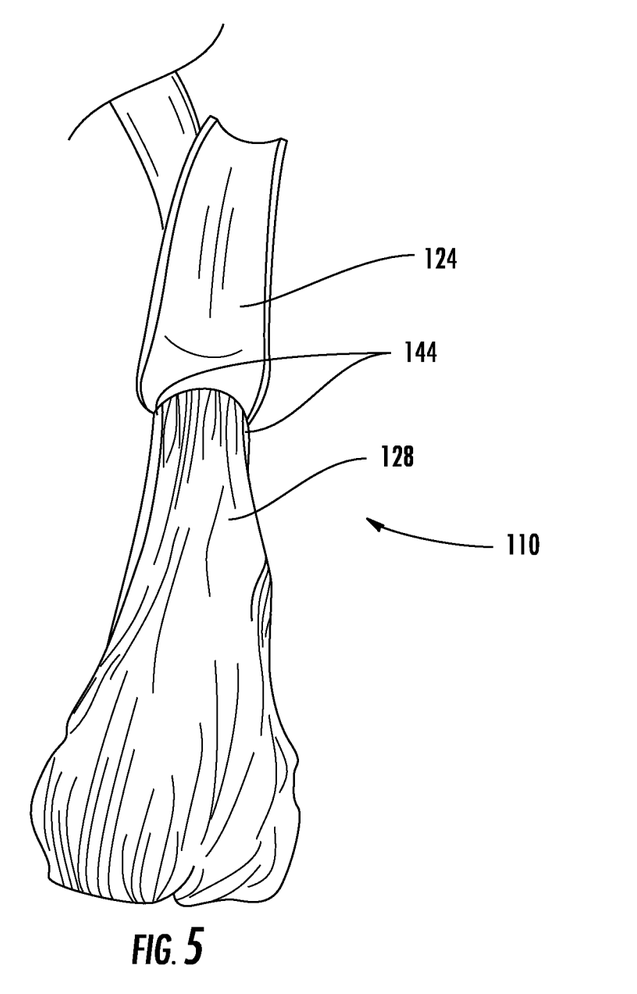
FIG. 5 is a front perspective-view of the fiber optic cable of FIG. 1 with the outer jacket being peeled open via material discontinuities in the outer jacket.

Referring now to FIGS. 3-5, according to an exemplary embodiment the subunit jacket 112 (see FIG. 4) is an indoor jacket including a flame-retardant jacketing material (e.g., polyvinyl chloride with fire-retardant additives), such as having a "riser" (OFNR) or "plenum" flame rating. In some embodiments, the outer jacket 124 is an outdoor jacket including medium- or high-density polyethylene, and may include ultra-violet light blocking contents. As such, the outer jacket 124 provide protection for the cable 110 from outdoor elements, and removal of a section of the outdoor jacket 124 and the second reinforcement material 128 converts the fiber optic cable 110 to an indoor cable (e.g., fire-rated cable). As such, the same cable 110 may be used for indoor and outdoor applications at the same time, such as routing, through the air, from a telephone pole to the side of a home, and then fire-rated routing (without the outdoor jacket 124) through walls of the home to computerized hardware inside the home. A splice of the optical fiber between indoor and outdoor segments is unnecessary. In other embodiments, the outer jacket 124 is also fire-rated, and/or the subunit jacket 120 is configured for outdoor use.

According to an exemplary embodiment, the optical fiber 120 is a single, tight-buffered optical fiber longitudinally aligned with the indoor jacket 116 and constrained by the first reinforcement material 122 such that the optical fiber 120 is without excess-fiber-length (e.g., less than 1% difference in length of the cable and length of the fiber 120). To achieve such a configuration with such a cable having components of different elasticity (e.g., aramid versus optical fiber), manufacturing of the cable 110 includes a step of tensioning the optical fiber 120 while extruding the indoor jacket 116 about first reinforcement material 122 and the optical fiber 120 so that the optical fiber 120 is without excess fiber length following cooling and shrinkage of the indoor jacket 116 after extruding the indoor jacket 116.

The tight configuration of the cable 110 of FIGS. 1-5 allows the cable to be particularly narrow. For example, in some embodiments, the tight-buffer of the optical fiber 120, the indoor jacket 116, and the outer jacket 124 are each round in cross-section, and the optical fiber 120, including the tight buffer 146 and glass core(s)/cladding 148 (see FIGS. 1A & 4), has an outer diameter of less than 1 mm, the indoor jacket 116 has an outer diameter less than 3.5 mm, and the outdoor jacket 124 has an outer diameter of less than 6 mm. Accordingly, the fiber optic cable 110 is configured for installation in particularly narrow ducts. In some such embodiments, the outdoor jacket 124 has an outer diameter of less than 5.5 mm, and may even have an outer diameter of 5 mm plus or minus 0.2 mm.

According to an exemplary embodiment, the optical fiber 120 is a commercially-available single- or multi-mode glass optical fiber, such as one of the many types manufactured and sold by Corning Incorporated. In some embodiments, the optical fiber 120 is a multi-core optical fiber, which includes more than one core within the same glass cladding (see, e.g., arrangement of four cores shown in FIG. 1). In still other embodiments, the optical fiber 120 is buffered in a loose tube, as opposed to being tight-buffered, where the first reinforcement material 122 adjoins the exterior of the buffer tube and the interior of the subunit jacket 116, coupling them together. In some embodiments, the cable 110 includes more than one optical fiber, such as a ribbon of two or more optical fibers joined together, or six optical fibers in a loose tube.

According to an exemplary embodiment, at least one of the outer jacket 124 and the subunit jacket 116 includes one or more discontinuities of material 144 that provide lengthwise paths for tearing open the respective jacket 116, 124 to access the contents therein. In some embodiments, the material discontinuities 144 are formed from a secondary material that is co-extruded into the primary jacket material. For example, a polyethylene outer jacket 124 may include discontinuities 144 of polypropylene (or a mixture of polypropylene and polyethylene, to improve bonding therebetween). FIG. 5 shows the outer jacket being peeled open via the material discontinuities 144. In other embodiments, cables may not include discontinuities of materials, but may include other access features, such as V-grooves to improve ease of access.

Figure 7:
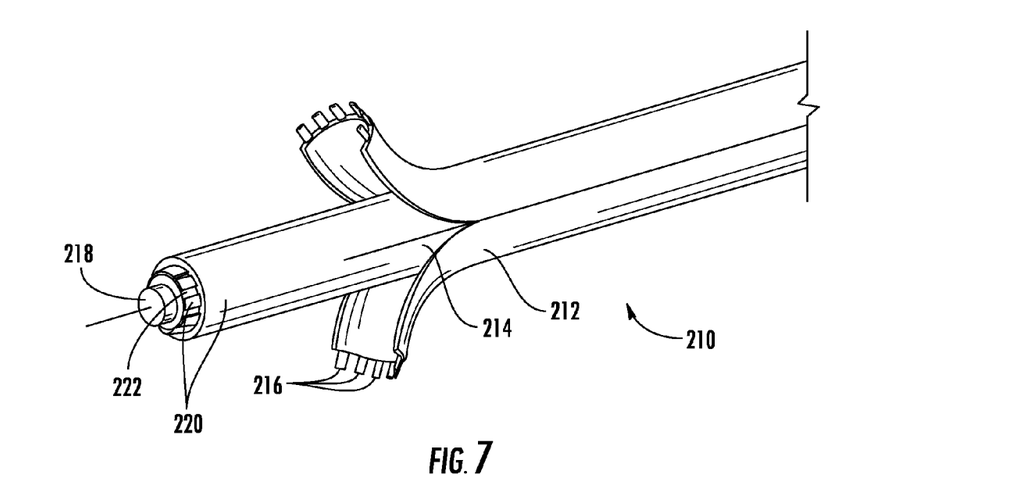
FIGS. 7-9 are perspective views of fiber optic cables according to other exemplary embodiments.

Referring to FIG. 7, a fiber optic cable 210 includes an outer jacket 212 with embedded material discontinuities 214 to facilitate opening the jacket 212. The outer jacket 212 further includes embedded fiberglass yarn 216 held within the jacket 212 in an orientation and position to provide anti-buckling strength to the jacket 212, which is intended to mitigate effects of cold-temperature shrinkage of the jacket 212. The material discontinuities 214 do not overlap the embedded fiberglass yarn 216 so the fiberglass yarn 216 does not interfere with tearing open the jacket 212 via the discontinuities 214. As shown, the embedded fiberglass yarns 216 are not stranded and the material discontinuities 214 extend in a straight line along the length of the outer jacket 212.

According to an exemplary embodiment, the fiber optic cable 210 further includes first and second reinforcement materials 218, 220. The first reinforcement material 218 is positioned within a subunit jacket 222 of the cable 210, and the second reinforcement material 220 is positioned between the subunit jacket 222 and the outer jacket 212, similar to the placement of the first and second reinforcement materials 122, 128 of the cable 110 (see FIG. 1). According to an exemplary embodiment, the second reinforcement material 220 includes aramid and fiberglass yarn, while the first reinforcement material 218 only includes aramid. One or more optical fibers may be positioned within the subunit, as disclosed with regard to the cable 110.

Figure 8:
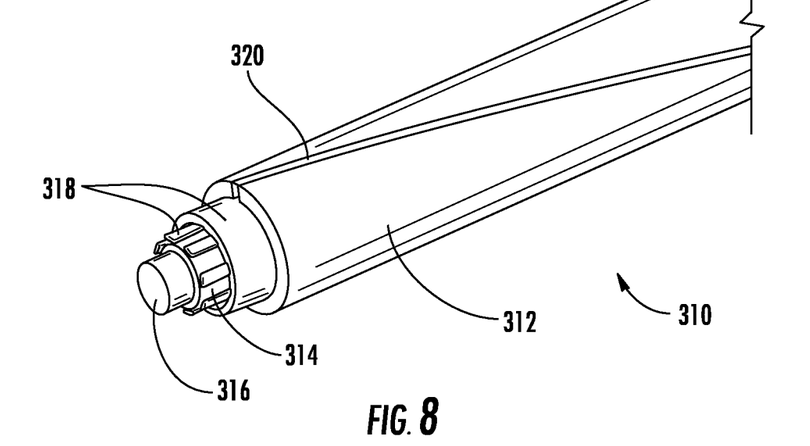
Figure 9:
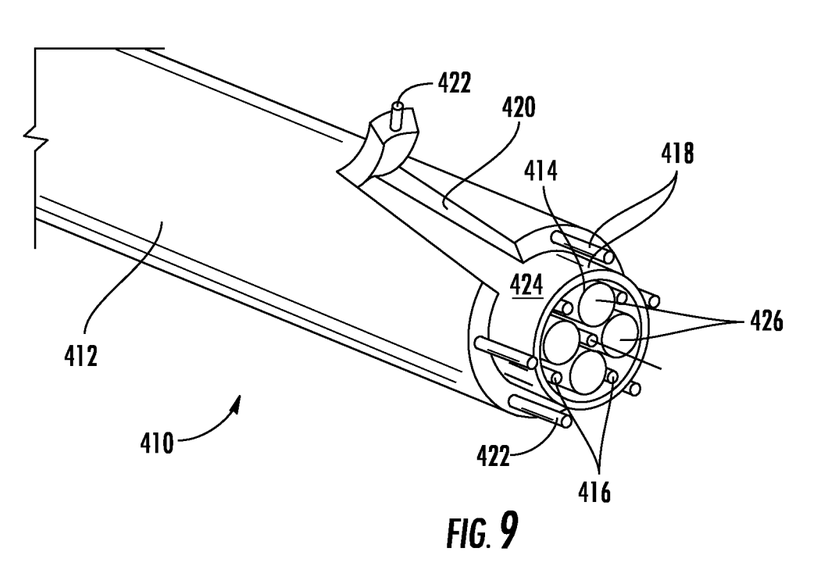

Referring now to FIGS. 8-9, cables 310, 410, according to alternative embodiments, include outer 312, 412 and subunit jackets 314, 414, as well as first and second reinforcement material 316, 318, 416, 418. In some embodiments, the second reinforcement material 318, 418 is embedded in or bonded to the outer jacket 312, 412 such that second reinforcement material 318, 418 remains attached to the outer jacket 312, 412 when the outer jacket 312, 412 is torn open via material discontinuities 320, 420. Preferably the second reinforcement material 318, 418 is arranged so as to be out of the way when the outer jacket 312, 412 is torn open. Tearing open the jacket 312, 412 then simultaneously controls and moves apart the second reinforcement 318, 418, which remains embedded in or bonded to the outer jacket 312, 412.

As shown in FIGS. 8-9, in contrast to FIGS. 1-7, the material discontinuities 320, 420 may spiral (or otherwise revolve (e.g., S-Z pattern)) lengthwise along the outdoor jacket 312, 412 such that lay lengths of the material discontinuities 320, 420 and the reinforcement material 318, 418 match one another; and tearing open the jacket 312, 412 then simultaneously controls and moves apart the second reinforcement 318, 418, which remains embedded in or bonded to the outer jacket 312, 412 for accessing the indoor jacket. Fiberglass yarn 422 of the cable 410 is embedded in the outer jacket 412, and aramid 424 is positioned between the outer jacket 412 and four subunits 426.

The construction and arrangements of the fiber optic cable, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. For example, in some embodiments glass-reinforced plastic strength members may be included in a cable as disclosed herein, such as embedded in an outer jacket. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive technology.

What is claimed is:

1. A method of manufacturing a fiber optic cable, comprising steps of:
   manufacturing a subunit by:
   extruding a subunit jacket over a first reinforcement material; wherein the subunit jacket defines a passageway interior thereto; wherein the subunit jacket is an indoor jacket comprising a flame-retardant jacketing material; wherein the first reinforcement material constrains, within the subunit jacket, an optical fiber extending through the passageway such that the optical fiber and the subunit jacket are coupled to one another by way of the first reinforcement material; and wherein the first reinforcement material is at least one of so positioned and non-rigid in bending such that the subunit has essentially no bend preference; and
   manufacturing an outer portion of the fiber optic cable by:
   pressure-extruding an outer jacket over a second reinforcement material to tightly constrain components of the fiber optic cable interior to the outer jacket; wherein the outer jacket is an outdoor jacket comprising medium- or high-density polyethylene; wherein the second reinforcement material is between the outer jacket and the subunit jacket, whereby removal of the outdoor jacket and the second reinforcement material converts the fiber optic cable to an indoor cable;

wherein the second reinforcement material is at least one of so positioned and non-rigid in bending such that, in combination with the subunit, the fiber optic cable has essentially no bend preference; and wherein hoop stress applied to the second reinforcement material by the outer jacket constrains the second reinforcement material between the subunit and outer jackets such that the second reinforcement material is held in position and oriented to provide anti-buckling support to the fiber optic cable and thereby mitigate effects on the optical fiber of jacket shrinkage due to low temperatures experienced by the fiber optic cable.

2. The method of claim 1, wherein pressure extruding of the outer jacket occurs at least at 100 bar, whereby, upon cooling, the outer jacket contracts and constrains the second reinforcement material.

3. The method of claim 1, wherein the step of manufacturing the subunit further includes tensioning the optical fiber while extruding the indoor jacket about first reinforcement material and the optical fiber so that the optical fiber is without excess fiber length following cooling and shrinkage of the indoor jacket after extruding the indoor jacket.

4. The method of claim 1, wherein the fiber optic cable has essentially no preferential bend such that magnitudes of forces, for loading the fiber optic cable on a free end thereof in a direction orthogonal to the length of the fiber optic cable and holding a fixed portion of the fiber optic cable that is 250 mm from the free end of the fiber optic cable to bend the fiber optic cable between the free end and fixed portion thereof so that the lengthwise center of the free end of the fiber optic cable is directed 30-degrees from the lengthwise center of the fixed portion of the fiber optic cable in any two different bend directions, differ by less than 25% of the magnitude of the greater of the forces for bending the fiber optic cable.

5. The method of claim 1, wherein the subunit has essentially no preferential bend such that magnitudes of forces, for loading the subunit on a free end thereof in a direction orthogonal to the length of the subunit and holding fixed a portion of the subunit that is 100 mm from the free end of the subunit to bend the subunit between the free end and fixed portion thereof so that the lengthwise center of the free end of the subunit is directed 30-degrees from the lengthwise center of the fixed portion of the subunit in any two different bend directions, differ by less than 25% of the magnitude of the greater of the forces for bending the subunit.

6. The method of claim 1, wherein the second reinforcement material comprises fiberglass yarn, wherein the fiberglass yarn includes a non-rigid binding material that includes at least one of cohesive polymers and a coating to clump fibers of the fiberglass yarn together in flattened strips, and wherein individual fibers of the fiberglass yarn are able to move relative to one another as the cable bends, thereby facilitating flexibility of the fiber optic cable.

7. The method of claim 1, wherein the second reinforcement material comprises fiberglass yarn in the form of flattened strips positioned around and adjoining the indoor jacket.

8. A method of manufacturing a fiber optic cable, comprising steps of:
manufacturing a subunit by:
extruding a subunit jacket over a first reinforcement material; wherein the subunit jacket defines a passageway interior thereto; wherein the subunit jacket is an indoor jacket comprising a flame-retardant jacketing material; wherein the first reinforcement material constrains, within the subunit jacket, an optical fiber extending through the passageway such that the optical fiber and the subunit jacket are coupled to one another by way of the first reinforcement material; and wherein the first reinforcement material is at least one of so positioned and non-rigid in bending such that the subunit has essentially no bend preference; and
tensioning the optical fiber while extruding the indoor jacket about first reinforcement material and the optical fiber so that the optical fiber is without excess fiber length following cooling and shrinkage of the indoor jacket after extruding the indoor jacket; and
manufacturing an outer portion of the fiber optic cable by:
extruding an outer jacket over a second reinforcement material; wherein the outer jacket defines an outer periphery of the cable; wherein the outer jacket is an outdoor jacket comprising medium- or high-density polyethylene; wherein the second reinforcement material is between the outer jacket and the subunit jacket, whereby removal of the outdoor jacket and the second reinforcement material converts the fiber optic cable to an indoor cable; wherein the second reinforcement material is at least one of so positioned and non-rigid in bending such that, in combination with the subunit, the fiber optic cable has essentially no bend preference; and wherein hoop stress applied to the second reinforcement material by the outdoor jacket constrains the second reinforcement material between the subunit and outer jackets such that the second reinforcement material is held in position and oriented to provide anti-buckling support to the fiber optic cable and thereby mitigate effects on the optical fiber of jacket shrinkage due to low temperatures experienced by the fiber optic cable.

9. The method of claim 8, wherein the step of extruding the an outer jacket includes pressure-extruding the outer jacket over the second reinforcement material to tightly constrain components of the fiber optic cable interior to the outer jacket.

10. The method of claim 8, wherein the second reinforcement material comprises fiberglass yarn stranded about the indoor jacket at a lay length of at least 200 mm, and wherein the first reinforcement material comprises aramid fibers aligned with the optical fiber and not having a lay length.

11. The method of claim 8, wherein the first reinforcement material comprises aramid fibers and the second reinforcement material comprises aramid fibers and fiberglass yarn, wherein aramid fibers of the first reinforcement material fully surround the optical fiber, separating the optical fiber from the indoor jacket, thereby forming a barrier mitigating sticking of the optical fiber to the indoor jacket during manufacturing of the subunit.

12. The method of claim 8, wherein the optical fiber is a single, tight-buffered optical fiber longitudinally aligned with the indoor jacket and constrained by the first reinforcement material such that the optical fiber is without excess-fiber-length, wherein the second reinforcement material comprises aramid fibers and fiberglass yarn, and wherein aramid fibers of the second reinforcement material are positioned between the fiberglass yarn and the outer jacket.

13. The method of claim 8, wherein the second reinforcement material comprises fiberglass yarn that adjoins the indoor jacket and is held tightly thereto by the hoop stress.

14. The method of claim 8, wherein the essentially no bend preference of the fiber optic cable is less than 1.25:1.

15. A method of manufacturing a fiber optic cable, comprising steps of:

manufacturing a subunit by:

extruding a subunit jacket over a first reinforcement material; wherein the subunit jacket defines a passageway interior thereto; wherein the subunit jacket is an indoor jacket comprising a flame-retardant jacketing material; wherein the first reinforcement material constrains, within the subunit jacket, an optical fiber extending through the passageway such that the optical fiber and the subunit jacket are coupled to one another by way of the first reinforcement material; and wherein the first reinforcement material is at least one of so positioned and non-rigid in bending such that the subunit has a bend preference less than the ratio of 2:1; and manufacturing an outer portion of the fiber optic cable by:

extruding an outer jacket over a second reinforcement material to constrain components of the fiber optic cable interior to the outer jacket; wherein the outer jacket is an outdoor jacket that blocks ultra-violet light; wherein the second reinforcement material is between the outer jacket and the subunit jacket, whereby removal of the outdoor jacket and the second reinforcement material converts the fiber optic cable to an indoor cable; wherein the second reinforcement material is at least one of so positioned and non-rigid in bending such that, in combination with the subunit, the fiber optic cable has a bend preference less than the ratio of 2:1; and wherein hoop stress applied to the second reinforcement material by the outer jacket constrains the second reinforcement material between the subunit and outer jackets such that the second reinforcement material is held in position and oriented to provide anti-buckling support to the fiber optic cable and thereby mitigate effects on the optical fiber of jacket shrinkage due to low temperatures experienced by the fiber optic cable.

16. The method of claim 15, wherein pressure extruding of the outer jacket occurs at least at 100 bar, whereby, upon cooling, the jacket contracts and constrains the second reinforcement material.

17. The method of claim 16, wherein pressure extruding of the outer jacket occurs at no more than 200 bar.

18. The method of claim 15, wherein the bend preference of the fiber optic cable is less than 1.5:1.

19. The method of claim 15, wherein the bend preference of the fiber optic cable is less than 1.25:1.

20. The method of claim 15, wherein the step of manufacturing the subunit further includes tensioning the optical fiber while extruding the indoor jacket about first reinforcement material and the optical fiber so that the optical fiber is without excess fiber length following cooling and shrinkage of the indoor jacket after extruding the indoor jacket.

* * * * *